May 19, 1964   A. NEUKOM ETAL   3,134,012
RESISTANCE BUTT WELDING MACHINE AND ARRANGEMENT
FOR REMOVING THE WELDING FLASH
Filed May 18, 1961   2 Sheets-Sheet 1

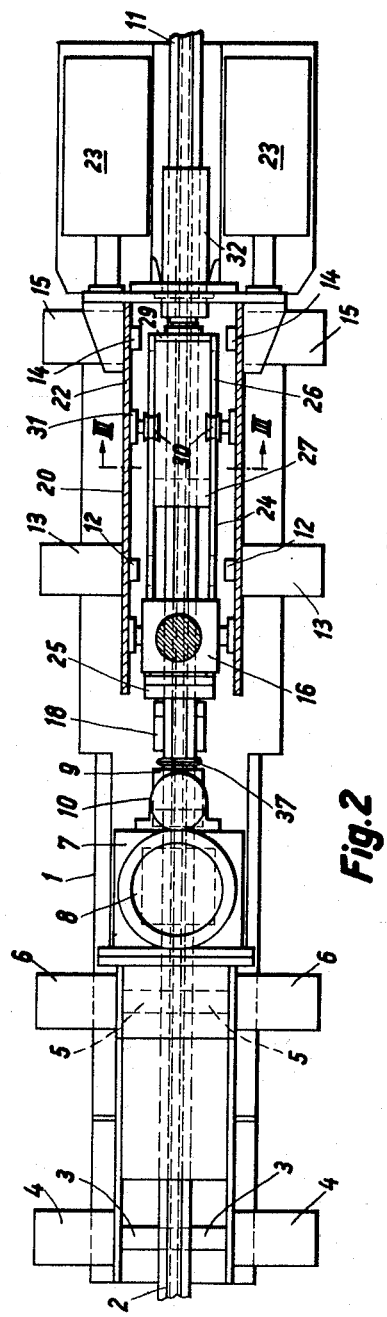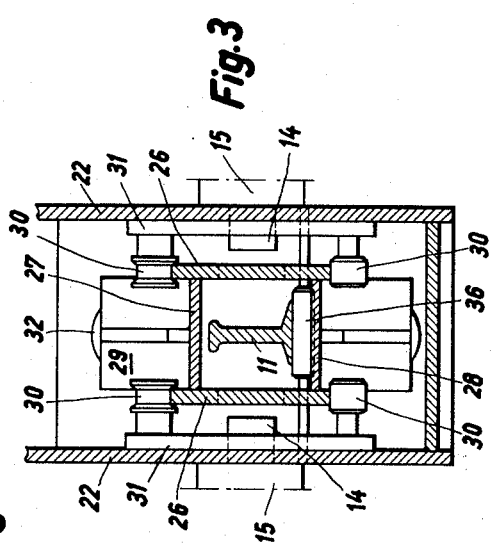

United States Patent Office 3,134,012
Patented May 19, 1964

3,134,012
RESISTANCE BUTT WELDING MACHINE AND ARRANGEMENT FOR REMOVING THE WELDING FLASH
Alfred Neukom, Dubendorf, Zurich, and Gunter Rabenow, Wettingen, Switzerland, assignors to H. A. Schlatter A.G., Zurich, Switzerland
Filed May 18, 1961, Ser. No. 110,930
Claims priority, application Switzerland May 25, 1960
9 Claims. (Cl. 219—101)

This invention relates to a resistance butt welding machine including means for removing the welding flash and is more particularly concerned with an arrangement for trimming the welding flash while the metal is still hot to thereby facilitate the flash trimming operation.

In prior art resistance butt welding machines of this type the clamping jaws holding one of the two welded work pieces are released and thereafter a suitable tool is advanced between the retracted clamping jaws and across the welding joint to remove the welding flash. This method of removing the welding flash makes it necessary to allow enough time to elapse so that the welding joint becomes sufficiently cool and hard that the section of the two welded work pieces which is no longer supported by the retracted clamping jaws is connected so rigidly at the welding joint that it does not change its position. In large resistance butt welding machines, especially for welding I-beams for railroad tracks, this would take approximately as much time as would be required to retract the clamping jaws.

When the welding joint has cooled down to the point where it is sufficiently rigid to hold the end of one of the two work pieces welded together, the welding flash has also become so hard that its removal is considerably more difficult. If the period for cooling the welding joint is reduced, the removal of the welding flash is made easier but the unsupported end of one of the two joined work pieces may move out of alignment with the end of the contiguous work piece under the effect of its own gravity if the welding joint has not sufficiently hardened. The mechanical stress exerted on the insufficiently hardened welding joint caused by the weight of the unsupported end of one of the two joined work pieces is detrimental in the production of a good welding joint.

According to the invention the flash removing tool is arranged in the rest position between the clamping jaws engaging one of the two work pieces to be welded adjacent the welding point and the welding point itself and may be moved across the welding point while these clamping jaws are still in their working position.

The process for removing the welding flash after the welding process has been completed consists in first moving the flash removal tool across the hot welding joint and releasing the clamping jaws only after the welding joint has cooled down.

The flash removing tool is driven by at least one and preferably by two hydraulic cylinders having double acting pistons. In the case of welding machines which have separate clamping jaws and current supply jaws for each of the two work pieces to be welded together, the current supply jaws being arranged a small distance from each other on each side of the welding joint, the flash removing or trimming tool is arranged in its rest position suitably between the current supply jaws for one of the two work pieces to be welded and the clamping jaws mounted adjacent to these current supply jaws. Upon the retraction of the current supply jaws the flash trimming tool is moved across the welding joint.

In operating the resistance butt welding machine of this invention the current supply jaws are retracted after the completion of the welding process, then the flash trimming tool is conducted across the welding joint and the clamping jaws are released after the welding joint has cooled down.

The invention is illustrated in the accompanying drawing which shows, as example only, a resistance butt welding machine for welding rails or I-beams and in which:

FIG. 2 is a plan view according to FIG. 1, partly in section, along line II—II of FIG. 1;

FIG. 3 is a section along line III—III of FIGS. 1 and 2 on a larger scale.

Figure 1:
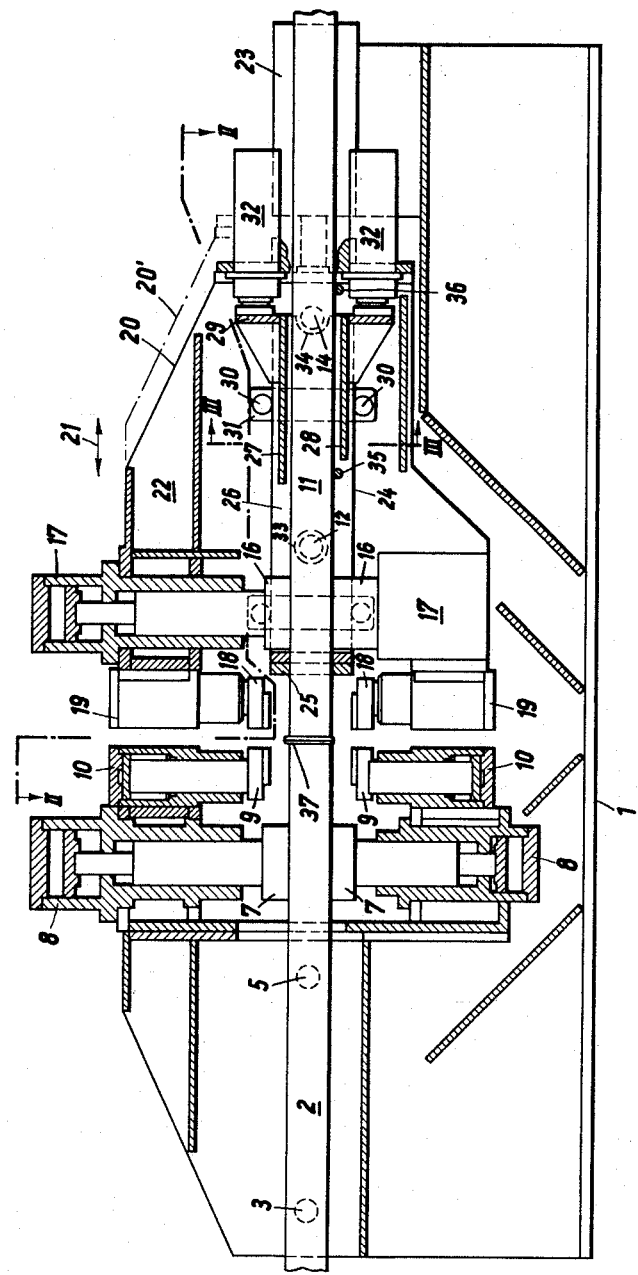
FIG. 1 is a vertical cross section through the machine showing two welded rail sections with the welding flash not yet removed.

Referring now more particularly to the drawing the resistance butt welding machine comprises a machine frame 1 which is adapted to support the various elements of the resistance butt welding and flash removing apparatus of the machine. Two horizontally disposed pairs of clamping jaws 3, 5 may be actuated by means of their respective driving cylinders 4, 6 to hold the end portion 2 of one of the two rails to be welded, and a vertically disposed pair of clamping jaws 7 having drive cylinders 8 are mounted on the machine frame 1. A pair of current supply jaws 9 are adapted to feed the welding current to the end portion 2 of one of the two rail sections and it may be pressed into contact with the rail by means of hydraulic drive cylinders 10. The jaws 3, 5, 7 and 9 are insulated from the machine frame 1 in any suitable manner (not shown). The current supply jaws 9 are connected in any suitable manner to a terminal of the secondary coil of a conventional welding transformer (not shown).

The clamping jaws 3, 5 and 7 are represented in the drawing in the working position in which they engage and hold the rail end portion 2 and the current supply jaws 9 are shown in the retracted or rest position.

Two horizontally disposed pairs of clamping jaws 12 and 14 may be actuated by means of hydraulic driving cylinders 13 and 15 respectively into engagement with the end 11 of the other I-beam or rail and a pair of vertically disposed clamping jaws 16 may be operated to engage the rail end 11 for supporting it in the welding position. A pair of current supply jaws 18 which may be actuated by means of hydraulic cylinders 19 is adapted to feed the welding current to the rail end 11. The current supply jaws 18 are connected in any suitable manner to the other terminal of the secondary winding of the conventional welding transformer (not shown).

The clamping jaws 12 and 14 and the current supply jaws 18 are shown in the drawing in the retracted or rest position while the clamping jaws 16 are shown in the working position, the rail end 11 being disposed freely between jaws 12, 14 and 18 and being supported by means of jaws 16. The horizontal clamping jaws 3, 5, 12 and 14 are of smaller and lighter construction than the vertical clamping jaws 7 and 16 which are arranged in closer proximity to the welding joint. The horizontal clamping jaws engage the rail ends 2 and 11 only on their sides and do not actually support the weight of the rails. The clamping jaws 12, 14 and 16 and the current supply jaws 18 are mounted on a carriage 20 which is not specifically shown in the drawing and which may be reciprocated on the machine frame 1 on rollers (not shown) in the direction of the double arrow 21. The carriage 20 has vertical side walls 22. FIGS. 1 and 2 show the carriage in its end position facing the pair of jaws 9.

The hydraulic cylinders 4, 6, 8, 10, 13, 15, 17 and 19 are connected to a hydraulic drive system not shown in detail in the drawing. The movable carriage is actuated by means of a hydraulic drive arrangement which comprises two cylinders 23 also not shown in detail.

Each of the two current supply jaws 9, 18 is mounted a short distance from the juxtaposed pairs of clamping jaws 7 and 16 respectively. In the end position of carriage 20 (FIG. 1) the pairs of current supply jaws 9 and 18 are also arranged a short distance from each other. As mentioned above each pair of current supply jaws is connected to a terminal of a conventional welding transformer (not shown).

The flash removing apparatus comprises a hydraulic driving arrangement and a box like support housing 24 which carries the flash trimming tool 25. The support housing 24 has two vertical side walls 26, the rear side wall of which is shown in FIG. 1, and an upper horizontal wall 27 as well as a lower horizontal wall 28. At the end of the support housing 24 facing the welding joint a frame-like flash trimming tool 25 is mounted. At the other end of the housing 24 a frame-like end plate 29 is mounted which is provided with an opening for the rail end 11.

The box like support housing 24 carrying the flash-trimming tool 25 is slidably mounted on rollers 30 in carriage 20 and movable in the direction of the double arrow 21. The rollers 30 are secured to side pieces 31 which are fixed to the vertical walls 22 of the carriage. The support housing 24 may be actuated by a hydraulic driving arrangement which includes two cylinders 32 having a double acting piston (not shown). In FIGS. 1 and 2 the support housing 24 of the flash trimming tool 25 is shown in its rest position relative to the carriage 20.

The distance between the side walls 26 is greater than the width of the clamping jaws 16 and the horizontal walls 27 and 28 are spaced from the clamping jaws 16 so that these jaws may be introduced in a vertical direction between the side walls 26 into the box-like housing 24 in order to engage the rail end 11, while still allowing the movement of housing 24 to slide the flash trimming tool 25 across the welding joint. The side walls 26 of the housing 24 are provided with openings 33 and 34 of sufficient size to easily accommodate the jaws of the horizontal clamping pairs 12 and 14 which pass through these openings to engage the rail end 11. In the position of the housing 24 shown in FIGS. 1 and 2 in which the flash trimming tool 25 is disposed between the current supply jaw 18 and the adjacent clamping jaw 16 the openings 33 are facing the jaws of the clamping pair 12 and the openings 34 are facing the jaws of the clamping pair 14. In this position the jaws of the clamping pairs 12 and 14 may pass in a horizontal direction through the openings 33 and 34 respectively and engage the rail end 11. As shown in the drawing (FIG. 3) the rail end 11 is supported in housing 24 on guide rolls 35 and 36.

The flash removing operation is preferably accomplished in the following manner:

In the starting position of the machine all the clamping jaw pairs 3, 5, 7, 12, 14 and 16 as well as the pairs of current supply jaws 9 and 18 are attracted. Only the current supply jaws 18 and the clamping jaws 12, 14 are in the position shown in the drawing. The carriage is retracted to the position identified by numeral 20' shown in dotted lines in FIG. 1. The flash removing apparatus 24, 25 is located relative to the carriage 20 in the position shown in the drawing. The flash removing tool 25 is thus disposed between the pair of current supply jaws 18 and the pair of clamping jaws 16. In this position of the machine the rail ends 2, 11 are introduced into the machine and are clamped by means of clamping jaw pairs 3, 5, 7, 12, 14 and 16 in a relatively aligned position. The current supply jaws 9 and 18 are also pressed against the rail ends. By controlling the driving force of the drive cylinders 23 and by suitably regulating the supply of the welding current the preheating, fusing and abutting of the rail ends is accomplished. During the abutting or pressing of the rail ends a welding flash 37 is produced at the welding joint. As soon as the abutting step has been completed and while the welding flash is still red hot the jaws of the pairs of current supply jaws 9 and 18 and of the horizontally disposed clamping jaw pairs 12 and 14 are retracted. All the clamping jaws 3, 5, 7, 12, 14 and 16 as well as the current supply jaws 9 and 18 are then located in the position shown in the drawing. The withdrawal of the jaws of the pairs of current supply jaws 9 and 18 and of the clamping jaw pairs 12 and 14 require relatively little time because these jaws are of a smaller and lighter construction than the vertically disposed clamping jaws. Immediately thereafter the support housing 24 carrying the flash-trimming tool 25 is moved by means of drive cylinders 32 across the welding joint and the welding flash which is still very hot is removed while the two rail ends 2 and 11 are held in position by means of clamping jaws 3, 5, 7 and 16 so that the welding joint which is still quite hot will not be deformed in this operation. After the welding flash has been removed or after a suitable cooling period during which the flash trimming tool may be returned to the rest position shown in FIG. 1, the clamping jaws 3, 5, 7 and 16 are also released and the welded and joined rails 2 and 11 are removed from the machine.

The clamping pairs 3 and 5 may also be released together with the clamping jaws 12 and 14 because the clamping jaws 7 are sufficiently strong to maintain rail end 2 securely in position during the flash removing process. If a particularly secure holding of both rail ends 2 and 11 is required all the clamping jaw pairs including the clamping jaws 12 and 14 may be kept in engagement with the rails throughout the flash removing operation. In order to permit the free movement of the support housing 24 and the flash trimming tool 25 past the engaged clamping jaws 12 the openings 33 in the side walls 26 of the support housing 24 may be formed as longitudinal slots.

While a preferred embodiment of the invention has been specifically illustrated and described many changes and modifications will become apparent to a person skilled in the art as coming within the spirit of the invention and the scope of the appended claims.

What is claimed is:

1. Resistance butt welding machine having a fixed support for one of the ends of two elongate workpieces to be welded together, a movable support for the other of said ends, means for clamping said ends to said supports, means for supplying electric current to said ends, means for moving said movable support to move said ends together to form a welding joint, a flash trimming tool arranged between said clamping means of said fixed support and said clamping means of said movable support, means for moving said trimming tool in the longitudinal direction of said work pieces across said welding joint while both work piece ends are clamped by said clamping means and maintained in position by said supporting means to remove the welding flash before it is hardened.

2. Resistance butt welding machine having a fixed support for one of the ends of two aligned elongated work pieces to be welded together, a movable support for the other of said work piece ends, means for clamping said ends to said supports, current supplying jaws for engaging and heating each of the confronting ends of the work pieces, means for moving said movable support to move said ends together to form a welding joint, a flash trimming tool arranged in its rest position between one of said current supplying jaw and the adjacent clamping means, and means for moving said trimming tool in the longitudinal direction of said work pieces across said welding joint while at least said last mentioned current supplying jaw is retracted and both work piece ends are clamped by said clamping means and maintained in aligned position by said supporting means to remove the welding flash before it has hardened.

3. Resistance butt welding machine having at least one pair of oppositely disposed horizontal clamping jaws and at least one pair of oppositely disposed vertical clamping jaws for supporting each of two elongate work pieces to be welded together, at least one pair of current supply jaws for engaging and heating each of the confronting ends of said work pieces, a movable carriage mounted in said machine and supporting the clamping jaws and current supply jaws for engaging one of said two work pieces, hydraulically operated driving means for actuating said carriage to press said one work piece against the other work piece and displace the metal at the confronting heated ends of said work pieces, and a flash trimming device comprising in combination an elongate rectangular housing having opposite vertical and horizontal wall members said one work piece being slideable through the open ends of said elongate housing into end-to-end engagement with the other work piece, a flash trimming tool connected to said vertical wall members adjacent the confronting ends of said work pieces, and hydraulically operated driving means for actuating said housing to pass said trimming tool across the welding joint in the longitudinal direction of said elongate work pieces while said one work piece is supported in position by at least one of said clamping jaws to remove the welding flash before it has hardened.

4. Resistance butt welding machine having two pairs of horizontally disposed clamping jaws and one pair of vertically disposed clamping jaws for supporting each of two elongate work pieces to be welded together, a pair of vertically disposed current supply jaws for engaging and heating each of the two confronting ends of said work pieces, a movable carriage mounted in said machine and supporting the clamping jaws and current supply jaws for engaging one of said two work pieces, hydraulically operated driving means for actuating said carriage to press said one work piece against the other work piece and displace the metal at the confronting heated ends of said two work pieces, and a flash trimming device comprising in combination an elongate rectangular housing having spaced opposite vertical and horizontal wall members, said one work piece being slideable between said spaced vertical and horizontal wall members into end-to-end engagement with the other work piece, said horizontal wall members being shorter than said vertical wall members to permit said pair of vertically disposed clamping jaws to enter between said vertical wall members into clamping engagement with said one work piece, a flash trimming tool connected to said vertical wall members adjacent the confronting ends of said work pieces, and hydraulically operated driving means for actuating said housing to reciprocate said trimming tool across the welding joint in the longitudinal direction of said elongate work pieces while both work pieces are supported by said pair of vertically disposed clamping jaws and at least one of said pairs of current supply jaws is retracted to remove the welding flash before it has hardened.

5. Resistance butt welding machine as defined in claim 4 wherein the flash trimming tool is located in its rest position between the pair of vertically disposed current supply jaws and the pair of vertically disposed clamping jaws.

6. Resistance butt welding machine as defined in claim 4 wherein the vertical walls of said trimming device are provided with openings for said pairs of horizontally disposed clamping jaws.

7. Resistance butt welding machine as defined in claim 4 wherein the vertical wall members of said trimming device are provided with horizontal slots for at least one pair of said horizontally disposed clamping jaws.

8. The method of operating a resistance butt welding machine having clamping means for supporting two aligned elongate work pieces to be welded together, and a flash trimming device for removing the welding flash comprising the steps of resistance butt welding said two aligned work pieces, removing said welding flash while the welding joint is still soft and while both work pieces are held in position by said clamping means, and thereafter releasing said clamping means when the welding joint has hardened.

9. The method of operating a resistance butt welding machine having clamping means for supporting two aligned elongate work pieces to be welded together, current supply jaws for heating the confronting ends of said aligned work pieces, and a flash trimming device for removing the welding flash comprising the steps of resistance butt welding said two aligned work pieces, retracting at least one of said current supply jaws, removing the welding flash while the welding joint is still soft and while both work pieces are held in position by said clamping means and thereafter releasing said clamping means when the welding joint has hardened.

References Cited in the file of this patent
UNITED STATES PATENTS

| | | |
|---|---|---|
| 2,124,849 | Drain | July 26, 1938 |
| 2,272,737 | Chapman | Feb. 10, 1942 |
| 2,302,420 | Chapman | Nov. 17, 1942 |
| 2,314,656 | Morton | Mar. 23, 1943 |
| 2,787,698 | Schlatter et al. | Apr. 2, 1957 |